(12) United States Patent
Markel et al.

(10) Patent No.: US 8,234,433 B2
(45) Date of Patent: Jul. 31, 2012

(54) INTERFACE MONITORING DEVICE, COMPUTER SYSTEM, AND METHOD FOR MONITORING A DIFFERENTIAL INTERFACE PORT

(75) Inventors: Ottwald Markel, Augsburg (DE); Rudolf Haeussermann, Augsburg (DE); Wolfgang Bossek, Augsburg (DE); Ingo Cestonaro, Augsburg (DE)

(73) Assignee: Fujitsu Technology Solutions Intellectual Property GmbH, Munich (DE)

(*) Notice: Subject to any disclaimer, the term of this patent is extended or adjusted under 35 U.S.C. 154(b) by 499 days.

(21) Appl. No.: 12/496,302

(22) Filed: Jul. 1, 2009

(65) Prior Publication Data

US 2010/0023744 A1     Jan. 28, 2010

(30) Foreign Application Priority Data

Jul. 28, 2008   (DE) .................... 10 2008 035 103

(51) Int. Cl.
*H05K 7/10* (2006.01)
*G06F 13/00* (2006.01)
*G06F 3/00* (2006.01)

(52) U.S. Cl. ............. 710/302; 710/15; 710/17; 710/19; 710/301

(58) Field of Classification Search ............... 710/15, 710/17–19, 301–302, 305, 200
See application file for complete search history.

(56) References Cited

U.S. PATENT DOCUMENTS

| | | | |
|---|---|---|---|
| 5,781,744 A | 7/1998 | Johnson et al. | |
| 6,326,816 B1* | 12/2001 | Su | 327/78 |
| 6,415,342 B1 | 7/2002 | Wahl et al. | |
| 7,043,587 B2 | 5/2006 | Burke et al. | |
| 7,877,788 B1* | 1/2011 | Topp et al. | 726/4 |
| 2002/0059494 A1* | 5/2002 | Kondo | 710/305 |
| 2003/0063601 A1* | 4/2003 | Niida et al. | 370/360 |
| 2004/0098604 A1 | 5/2004 | Noldge | |
| 2009/0212844 A1* | 8/2009 | Darmawan et al. | 327/427 |

FOREIGN PATENT DOCUMENTS

| | | |
|---|---|---|
| DE | 100 21 924 A1 | 2/2001 |
| DE | 102 51 642 A1 | 6/2004 |
| DE | 10 2005 009 357 A1 | 9/2006 |
| DE | 10 2007 005 113 A1 | 8/2008 |
| EP | 1 953 667 A1 | 8/2008 |

OTHER PUBLICATIONS

Compaq, et al., "Low-speed and Full-speed Data Signal Rise and Fall," Universal Serial Bus Specification Revision 2.0, Apr. 2000, 1 page.

Compaq, et al., "Universal Serial Bus Specification," Apr. 27, 2000, pp. 149-152, Revision 2.0.

\* cited by examiner

*Primary Examiner* — Thomas J Cleary

(74) *Attorney, Agent, or Firm* — Slater & Matsil, L.L.P.

(57) ABSTRACT

An interface monitoring device can be used with at least one differential interface port with a positive and a negative data line for connecting a peripheral device. The interface monitoring device has a monitoring circuit and a deactivation circuit. The monitoring circuit is designed to monitor at least one signal level dependent on the signal level of the positive and/or the negative data line and the deactivation circuit is designed to stop data traffic via the positive and/or the negative data line of the at least one interface port.

15 Claims, 4 Drawing Sheets

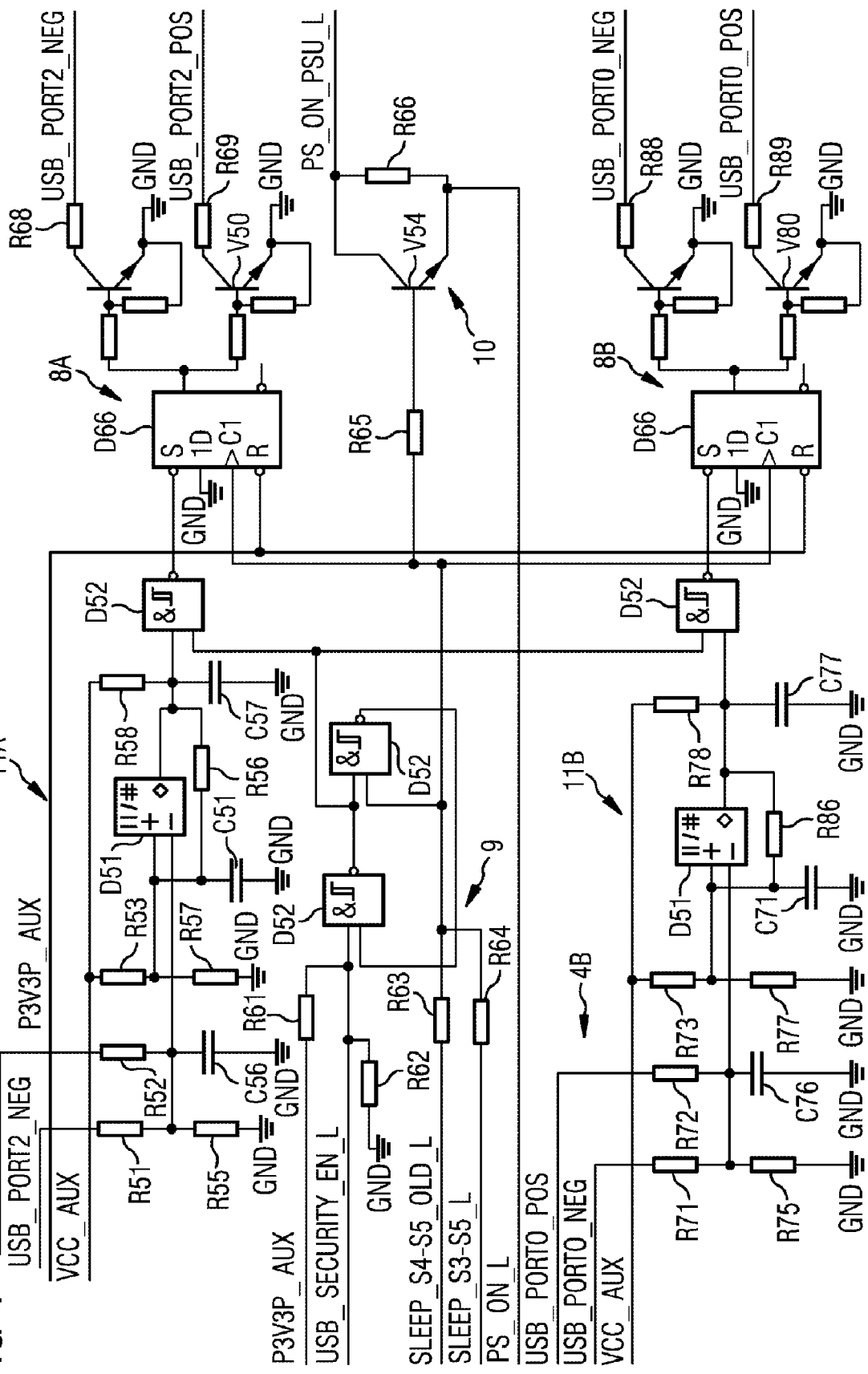

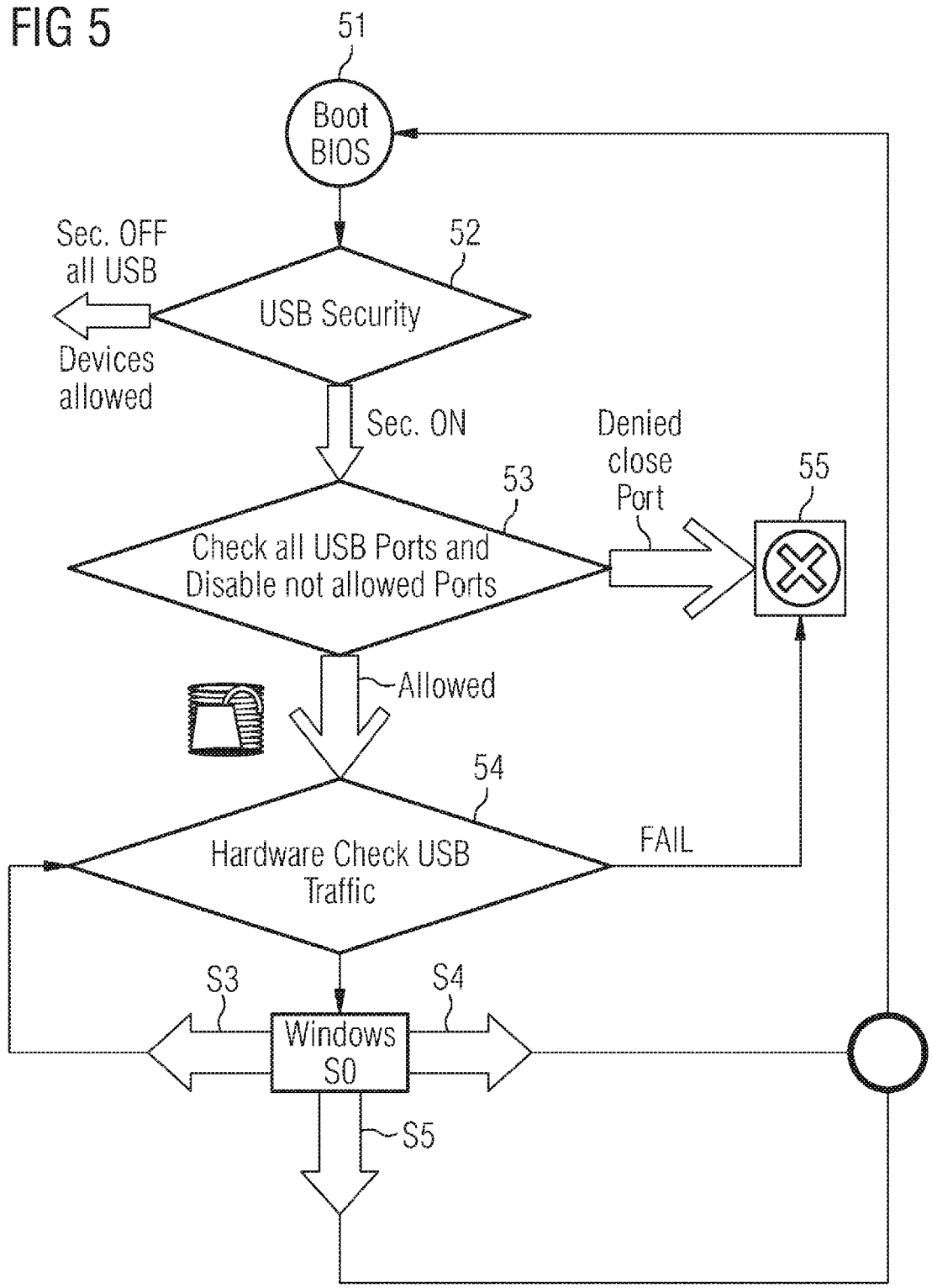

INTERFACE MONITORING DEVICE, COMPUTER SYSTEM, AND METHOD FOR MONITORING A DIFFERENTIAL INTERFACE PORT

This application claims priority to German Patent Application 10 2008 035 103.2, which was filed Jul. 28, 2008 and is incorporated herein by reference.

TECHNICAL FIELD

The invention relates to an interface monitoring device for at least one differential interface port with a positive and a negative data line for connecting a peripheral device. The invention further relates to a method for monitoring a differential interface port with a positive and a negative data line.

BACKGROUND

Many different differential interface ports with a positive and a negative data line are known. In particular, in the field of computers and peripheral devices connected to computers, the so-called Universal Serial Bus (USB) has become very widespread. In addition to the USB protocol, however, there also exist other differential interfaces for connecting electronic devices and components.

USB and technically similar interfaces support so-called "hot plugging," that is, the connection and disconnection of peripheral devices to a host component while the host component and/or the peripheral device are running. Simultaneously, these interfaces support a plurality of different device types, such as, for example, mice and keyboards, memory sticks, external hard drives, and so on.

However, especially for the connection of external mass storage media to a running computer system, there is the risk that the security of a host system will be endangered.

For example, by connecting USB memory sticks, viruses or other malware could be transferred onto the host computer system. In addition, the theft of relatively large quantities of data is also very easy.

In order to counter these problems and similar problems, monitoring and filtering mechanisms are known that exclude the connection of certain device types to a computer system. For example, U.S. Pat. No. 7,043,587 B2 discloses a method and a system for controlling the addition of USB devices to a host computer system by means of a hardware hot-plug detector circuit that monitors USB ports. Here, when a new USB device is connected, a signal is transmitted in the form of a system management interrupt to an SMI handler in the BIOS of the computer system that then queries the device type.

Although the known solution features numerous advantages with respect to the security of the system, it also has several disadvantages. In particular, the monitoring function is implemented at least partially in software and thus is itself susceptible to hacker attacks. In addition, the protective mechanism engages only when a new device is connected and is based on the device class transmitted by the connected device. Thus, a connection of an unauthorized component cannot be prevented in every situation.

SUMMARY

In one aspect, the present invention discloses an improved interface monitoring device that first has, a relatively simple construction and that, second, can guarantee the intended protective effect for every case. Preferably, the described interface device should be suitable for use with different interface types and transmission protocols.

According to a first aspect of the invention, an interface monitoring device for at least one differential interface port with a positive and a negative data line is described for connecting a peripheral device, a monitoring circuit coupled with the positive and the negative data line, and a deactivation circuit. The monitoring circuit is designed to monitor at least one signal level dependent on the signal level of the positive and/or the negative data line and to signal a disconnection of a peripheral device from the interface port when both the signal level of the positive and also the negative data line lie below a predetermined reference level for a predetermined time period. The deactivation circuit is designed to permanently stop data traffic via the positive and/or the negative data line of the at least one interface port until the interface monitoring device is reset, when a disconnection of a peripheral device connected to the interface port was signaled by the monitoring circuit.

Through the combined monitoring of a signal level of a positive and a negative data line, possible manipulation can already be identified at the disconnection of a device connected to the interface port. Here, the monitoring is for the most part independent of the signaling protocol that is used. Through the deactivation circuit, the interface port is then permanently deactivated, so that a subsequent connection of another device is no longer possible.

According to a first advantageous embodiment, the monitoring circuit comprises at least one comparator that is designed to compare a voltage level allocated to the at least one monitored signal level with a predetermined reference voltage. Through the use of a comparator for comparing a monitored voltage level with a predetermined reference voltage, a disconnection of a device from an interface port can be determined very easily.

According to another advantageous embodiment, the interface monitoring device is characterized by an initialization circuit for resetting the interface monitoring device, wherein the initialization circuit is designed to activate the interface monitoring device when a first control signal is provided. Through the initialization circuit, the interface monitoring device is permanently activated when the control signal is provided, so that, for example, a BIOS can decide on the protection of the interface port during the system start based on specific defaults or tests. In contrast, interaction of the BIOS going beyond this action is not required during operation.

According to another advantageous embodiment, the interface monitoring device is characterized in that the initialization circuit evaluates at least one second control signal for signaling an operating state, wherein the interface monitoring device is then reset only when a change from an operating state is signaled in which the interface port is reinitialized. By monitoring a control signal for signaling an operating state, the interface monitoring device can differentiate between a temporary ready state and a restart of a device containing the interface monitoring device.

According to one advantageous embodiment, the interface monitoring device is characterized in that it is constructed as a discrete hardware circuit, wherein at least the monitoring circuit works functionally independent from a software controller of the interface port. Through the use of a discrete hardware circuit, a software-side manipulation of the interface monitoring device can be excluded. Here, "discrete" basically means that no complex or programmable integrated circuits are used for implementing the hardware circuit, but not that each circuit element is constructed as a separate electronic component. In particular, several functionally identical or similar gates can also be assembled into a unified component.

According to a second aspect of the invention, a computer system is described that has an interface monitoring device with at least one interface port for connecting a peripheral device, a monitoring circuit, and a deactivation circuit, and a non-volatile memory with a BIOS program for initializing the computer system and for the subsequent loading of the operating system. The computer system is characterized in that the BIOS program is designed to identify a device class of a peripheral device connected to the interface port when the computer system is started and to compare this identified device class with a list of permissible device classes, to activate monitoring of the interface port by the monitoring circuit when a peripheral device of a permissible class is identified, and to deactivate the interface port when a peripheral device with an impermissible device class is identified.

In the described computer system, devices connected to the interface ports are identified when the system is started, so that the connection of impermissible device classes is excluded when the system is started. The subsequent exchange of a permissible device, such as, for example, a keyboard or a mouse, for an impermissible device, such as, for example, removable memory or an USB hub, is excluded by the interface monitoring device.

According to a third aspect of the invention, a method for monitoring a differential interface port with a positive and a negative data line is described. At least one signal level, which is dependent on the signal level of the positive and/or the negative data line, is continuously monitored. A disconnection of a peripheral device from the interface port is signaled when both the signal level of the positive and also the negative data line simultaneously fall below a predetermined reference level for a predetermined time period. The interface port is deactivated until the interface port is reset when a disconnection of the peripheral device from the interface port was signaled.

Through the above-mentioned processing steps, an interface port is protected in an operating phase before the connection of other devices.

According to an advantageous construction, after the resetting of the interface port, the following steps are executed. The interface port is initialized and it is identified whether a peripheral device is connected to an interface port. The interface port is deactivated if no peripheral device was identified at the interface port. The device type is identified when a peripheral device was identified at the interface port. The interface port is deactivated when the identified device type corresponds to an impermissible device class.

Through the processing steps named above, monitoring of the devices connected to an interface port is already guaranteed during the initializing or resetting of the interface port.

BRIEF DESCRIPTION OF THE DRAWINGS

The invention will be described in greater detail using embodiments with reference to the figures.

FIG. 4, shows a circuit diagram according to a second embodiment of an interface monitoring device;
and
FIG. 5, shows a state diagram of a system for monitoring a differential interface port.

DETAILED DESCRIPTION

Figure 1:
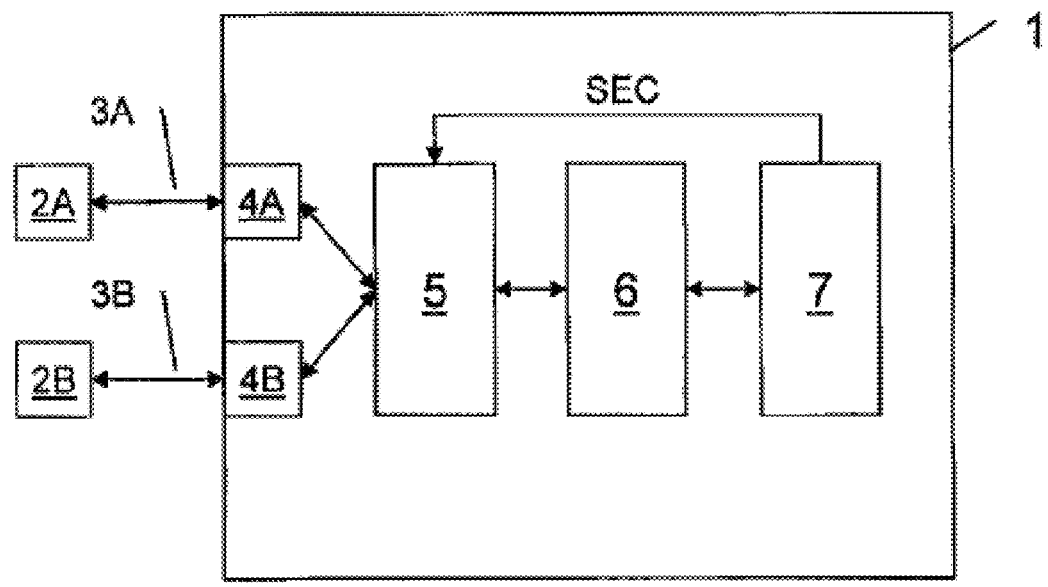
FIG. 1, shows a schematic diagram of a system with an interface monitoring device.

FIG. 1 shows a system comprising a computer system 1 and two peripheral devices 2A and 2B connected to the computer system 1. The peripheral devices 2A and 2B are each connected to the computer system 1 by means of a respective USB port 3A or 3B.

The computer system 1 comprises an interface port 4A and an interface port 4B to which the USB ports 3A and 3B respectively are connected. The interface ports 4A and 4B are connected to an interface monitoring device 5. The interface monitoring device 5 is connected to an interface component 6 that controls the interface ports 4A and 4B and regulates the data exchange between the peripheral devices 2A and 2B and the computer system 1. For example, here it involves a so-called I/O controller hub (ICH) or a separate interface controller. The interface component 6 is connected to a BIOS component 7 with programming code for initializing the interface ports 4A and 4B. By means of a control signal SEC, the monitoring device 5 can be activated by the BIOS component 7. Extensive interaction of the BIOS in the monitoring is unnecessary.

Figure 2:
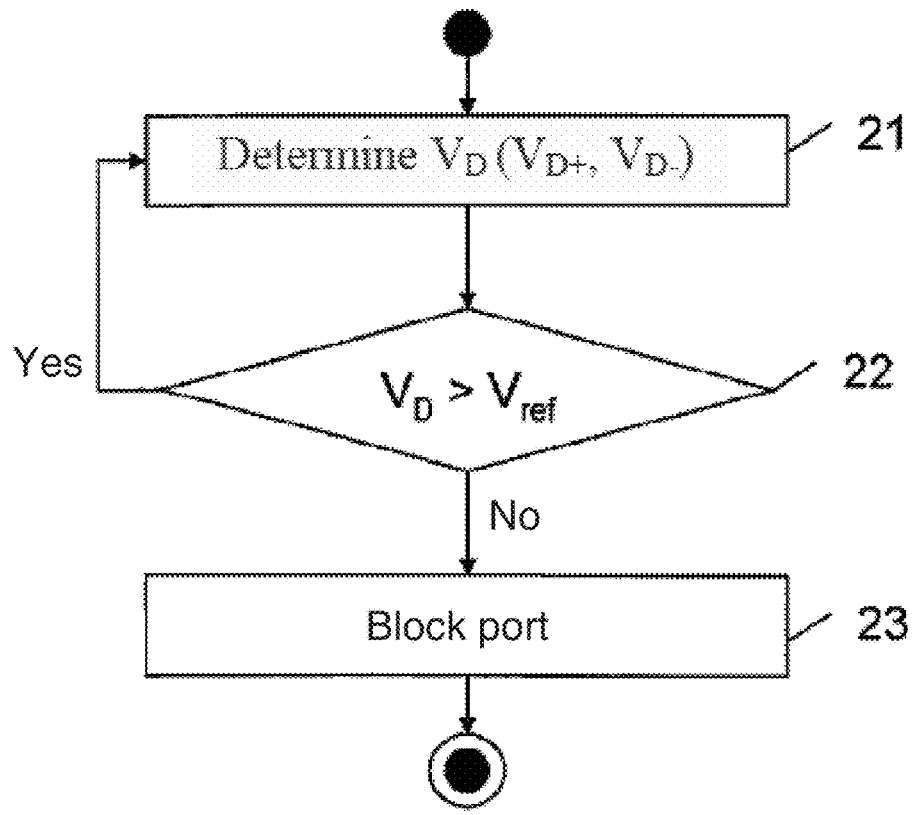
FIG. 2, shows a flow chart of a method for monitoring a differential interface port.

Before the details of the interface monitoring device 5 are discussed, initially the basic monitoring of the interface ports 4A and 4B will be described. FIG. 2 shows a flow chart of a processing method for the interface monitoring device 5.

The USB ports 3A, 3B according to the described embodiment involve a serial, differential interface port in which the electrical signals for data exchange are transmitted with respect to a common reference potential once as a positive and once as a negative signal on two physically different data lines D+ and D− that together form a logical differential data line. Here, in dependence on the data transmission class of a connected peripheral device 2A, or 2B, at least one of the two physical data lines D+ or D− is pulled toward a positive electrical potential in order to signal the speed of the data transmission device. For example, in the so-called low-speed transmission mode, the D− data line is pulled toward a high voltage level and in the so-called full-speed or high-speed transmission modes, the D+ data line is pulled toward a high voltage level.

In addition, according to the USB protocol, a constant data exchange takes place between an interface component 6 and a peripheral device 2A or 2B connected to this component. This is used especially for frame synchronization for the exchange of data frames between the computer system 1 and the peripheral devices 2A, 2B connected to the system. In the full-speed transmission mode, the frame length corresponds to a signal length of 1 ms and in the high-speed transmission mode, a so-called μ-frame corresponds to a signal length of 125 μs.

Due to these characteristics, the level of the positive data line D+ and the level of the negative data line D− are always located at a voltage level different from zero, apart from short zero crossings, for a peripheral device 2A or 2B connected to an interface port 3A or 3B. However, if a peripheral device 2A or 2B is removed, then the data lines D+ and D− fall to a very low level for a longer time period, for example, several milliseconds.

Therefore, after an initial initialization, in step 21 a signal level $V_D$ dependent on the signal level of the differential data lines $V_{D+}$ and $V_{D−}$ is determined continuously or at relatively short time intervals. Here, very short signal pauses, like those that appear, for example, for temporary inactivity of a peripheral device, are ignored.

Therefore, in a query shown in FIG. 2, in step 22, the level $V_D$ that depends on the signal levels of the differential data lines D+ and D− of the interface ports 4A and 4B, respectively, is compared with a predetermined reference voltage level $V_{ref}$. If the level of the differential data line exceeds the predetermined reference level $V_{ref}$, the method continues in step 21 with the monitoring of the differential data line. According to the embodiment shown in FIG. 3 and described later, the amount of the reference voltage $V_{ref}$ equals, for example, 60 mV.

However, if the level of the differential data line falls below the voltage level $V_{ref}$ in step 23, the associated interface port 4A or 4B is permanently blocked. For example, the data lines D+ and D− can be disconnected between the port 4A or 4B and the interface component 6. Alternatively, the data lines D+ or D− can also be set at a fixed reference potential in order to stop communications or the establishment of a new connection via these data lines.

Figure 3:
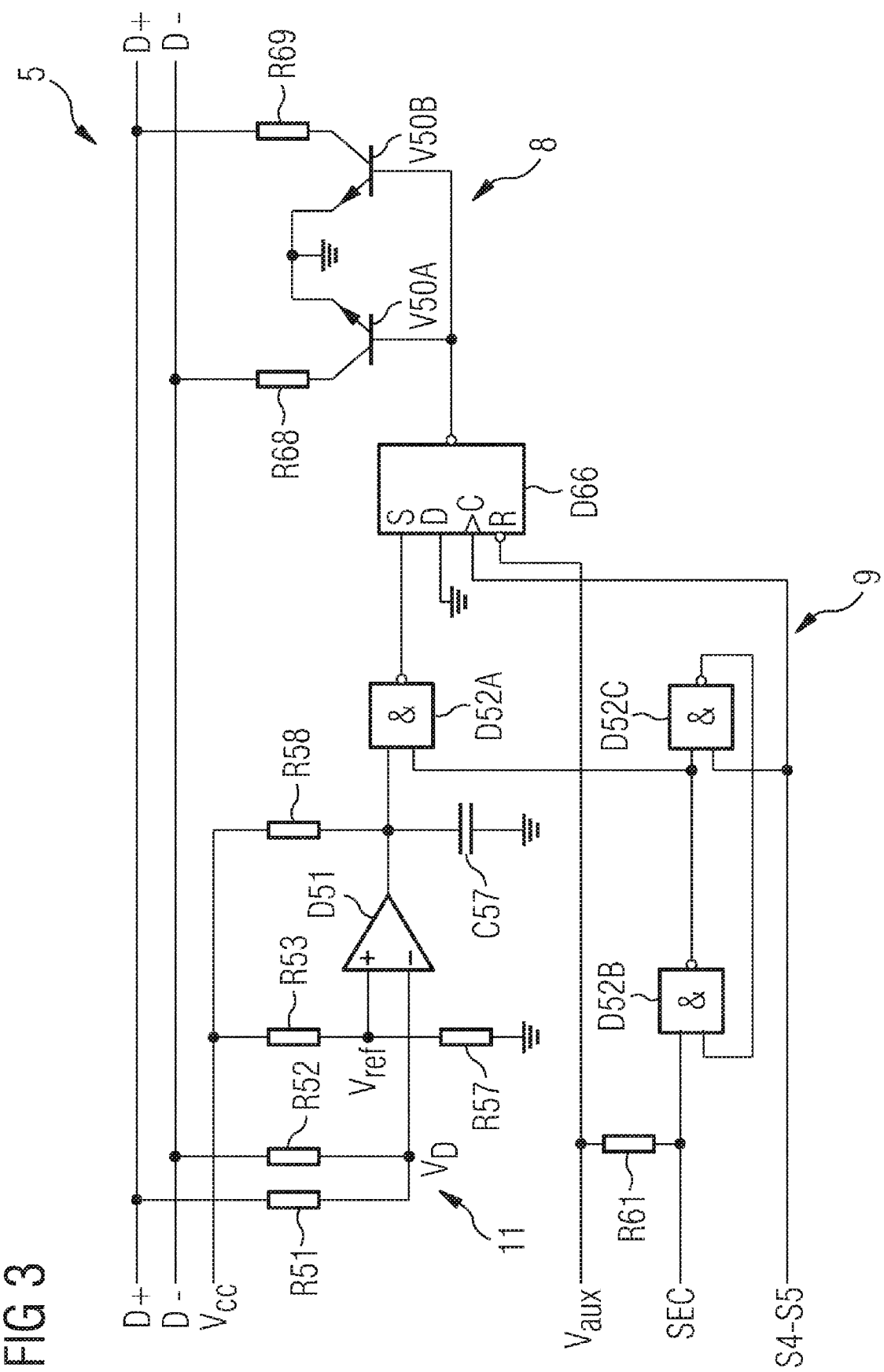
FIG. 3, shows a circuit diagram according to a first embodiment of an interface monitoring device.

FIG. 3 shows a first, simplified circuit for implementing the interface monitoring device 5. The interface monitoring device 5 comprises an initialization circuit 9, a deactivation circuit 8, and a monitoring circuit 11.

According to FIG. 3, a positive data port D+ and a negative data port D− are each connected by means of a resistor R51 and R52, respectively, and a node with the voltage level $V_D$ to the negative input, of a comparator D51. The positive input+ of the comparator D51 is set at a fixed reference voltage $V_{ref}$ by means of a voltage divider comprising the resistors R53 and R57. As long as the resulting voltage level $V_D$ exceeds the reference level $V_{ref}$ on the positive input+ of the comparator D51, this delivers a negative output signal on its output.

In contrast, if the voltage level $V_D$ falls below the reference voltage $V_{ref}$ of the voltage divider, the comparator D51 outputs a positive output signal and a capacitor C57 is charged via the resistor R58. The capacitance of the capacitor C57 and the resistor R58 define a time constant. After this time has elapsed, the voltage on the output of the comparator D51 exceeds a switching voltage of a first input of a NAND gate D52A.

The second input of the NAND gate D52A is connected to an initialization circuit 9 for activating the interface monitoring device 5 that is described farther below. In normal operation, i.e., for activated interface monitoring, the initialization circuit 9 provides a high voltage level. Now, if the voltage on the first input of the NAND gate D52A rises to a high voltage level, in this case the NAND gate D52A switches its inverted output to a low voltage level. For deactivated interface monitoring, a low voltage level always lies on the second control input of the NAND gate D52A and the output of the NAND gate D52A always remains at a high voltage level.

The output of the NAND gate D52A is connected to an inverted set input S of a flip-flop component D66. Due to the inversion, a low voltage level on the set input S causes a setting of the flip-flop circuit D66 and thus activates a downstream deactivation circuit 8. By means of the downstream deactivation circuit 8, the differential data lines D+ and D− are permanently deactivated when the disconnection of a device is identified. For this purpose, two transistors V50B and V50A are provided for the positive data line D+ and the negative data line D−, respectively. These transistors pull the data line D+ or D− by means of the resistors R69 and R68, respectively, to a predetermined electrical voltage level. In the shown deactivation circuit, the data lines D+ and D− are connected to the ground potential by means of the resistors R69 and R68, respectively.

In the lower part of FIG. 3, the initialization circuit 9 for initializing the interface monitoring device 5 is shown. It comprises two additional NAND gates D52B and D52C and is connected to the second input of the first NAND gate D52A. Through the shown wiring, the initialization circuit 9 can differentiate between a so-called ready state or operating state, in particular, the ACPI states S0-S3, and a rest state or deactivated state of the computer system 1, in particular, the ACPI states S4 and S5. In the first case, that is, in the S0 to S3 states, a continuous monitoring of the interface ports 4A, 4B by the monitoring circuit 11 is guaranteed. In contrast, in the second case, that is, in the S4 or S5 state, the interface monitoring device 5 is reset to a boot state in which a device 2A or 2B is connected to the interface port 4A, 4B and is initially identified and optionally tested when the computer system 1 is started.

When the computer system 1 is activated or restarted, for the desired USB monitoring, after successful device testing by the BIOS 7, the control signal SEC is pulled to ground. Then the NAND gate D52B switches its output to a high voltage level and the monitoring circuit 11 is active. This state is also locked by means of the feedback of the NAND gates D52B and D52C.

By means of the control signal S4_S5, it is signaled whether the computer system is situated in an operating state, especially the S0, S1, or S3 state, or a rest state, especially the S4, S5, or G3 state. If the system was previously in a rest state, the signal S4_S5 is located at a low voltage level, the NAND gate D52C switches its output to a high voltage level, and the gate D52B switches the output to a low voltage level, so that the monitoring can be reactivated only by the control signal SEC from BIOS 7. Simultaneously, the flip-flop D66 is reset by means of the clock input C1 with the rising edge and again releases the deactivation circuit 8 and the interface port 4A, 4B again works. In the other case, that is, in the prior operating state, the circuit remains in the prior state, that is, the monitoring remains active, when it was previously active and remains inactive, when it was previously inactive. If the interface port 4A, 4B was blocked, it also remains blocked in the ACPI S3 state, wherein the block also remains for reentry into the ACPI S0 state.

FIG. 4 shows a second construction of an interface monitoring device 5. The interface monitoring device 5 shown in FIG. 4 is used for monitoring two interface ports 4A and 4B. Accordingly, in the circuit according to FIG. 4, two comparators D51 are provided for monitoring the voltage level of the first interface port 4A or the second interface port 4B respectively. In addition, the circuit according to FIG. 4 also comprises two deactivation circuits 8A and 8B with which the first data port 4A or the second data port 4B can be monitored separately from each other and blocked.

The monitoring circuits 11A and 11B with the comparators D51 and also the deactivation circuits 8A and 8B basically correspond to the monitoring circuit 11 or the deactivation circuit 8 according to FIG. 3, wherein, in FIG. 4, additional circuit details are shown. The initialization circuit 9 is also constructed similar to the initialization circuit 9 according to FIG. 3, but is used for the initialization of the entire interface monitoring device 5, that is, the initialization of the first and second monitoring circuit 11A and 11B, respectively, and also the first and second deactivation circuit 8A and 8B, respectively.

In the circuit diagram according to FIG. 4, it is to be identified that the comparators D51 are arranged in a common integrated circuit. Likewise, the total four NAND gates D52 are arranged in a common integrated circuit. In addition, its switching inputs have Schmitt-trigger circuits.

Compared with the circuit according to FIG. 3, the circuit according to FIG. 4 also comprises a safety function with a power-supply deactivation circuit 10. It essentially includes the resistor R65 and also a transistor V54. The power-supply deactivation circuit 10 monitors a control signal applied to its clock input C1 for resetting the flip-flop D66. If the power-supply deactivation circuit 10 determines a manipulation to this control signal, it deactivates the power supply of the system via the control signal PS_ON_PSU_L and the computer system 1 shuts down.

FIG. 5 shows a state diagram of the interface monitoring device 5. When the computer system 1 is activated or restarted, a boot process takes place under the control of the BIOS 7. This is shown in step 51.

In step 52, with reference to a setting stored in the CMOS component, it is tested whether interface monitoring is desired or not. If no interface monitoring is desired, all of the interface ports 4A, 4B are released and the interface monitoring device 5 remains deactivated.

If interface monitoring is desired, in step 53 all of the interface ports 4A, 4B are initialized and the peripheral devices connected to these ports are tested. Here, the interface ports 4A, 4B to which no peripheral device 2A, 2B is connected are permanently deactivated. In addition, the interface ports 4A, 4B to which an impermissible device type, for example, a mass-storage device or USB hub, was identified are permanently deactivated.

The deactivation is shown as step 55. For deactivation, preferably the deactivation circuit 8 is used. Alternatively, the corresponding interface ports 2A, 2B could not be reported to an operating system by the BIOS 7 or could be deactivated directly in the interface component 6, for example, in a Southbridge or in an I/O controller hub.

For the remaining interface ports 2A, 2B, the interface monitoring device 5 is initialized. For example, the signal SEC or USB_SECURITY_EN_L respectively is pulled to ground. Therefore, in a step 54, the data traffic on the data lines D+ and D− of the activated interface ports 4A, 4B is then monitored. If there is no more data traffic via an interface port 4A or 4B or if the monitored voltage level $V_D$ falls below a predetermined level, the associated interface port 4A, 4B is permanently deactivated in step 55. For this purpose, the deactivation circuit 8 is used whose blocking can no longer be canceled by software, especially by an operating system.

In addition, in step 54 it is monitored whether a change to a different operating mode of the computer system is performed. For a change into the so-called S3 ready state, that is, a state in which the processor is stopped, but the system is not restarted, the interface monitoring remains active. For a change to an energetically lower rest state, for example, one of the ACPI states S4, S5, or G3, in each case a subsequent system restart takes place. In this case, the BIOS again performs, in step 51, the monitoring of the individual interface ports 4A, 4B. Therefore, in these cases, the continuation of the monitoring can be eliminated and the circuit is reset.

Thus, the circuit arrangement and the method described herein provide comprehensive protection against the connection of impermissible devices 2A, 2B to the interface ports 4A, 4B. Here, the circuit has a relatively simple construction. For example, for monitoring two interface ports 4A and 4B, the circuit arrangement shown in FIG. 4 has, in addition to a few resistors and capacitors, only three integrated semiconductor circuits, namely the comparator component D51, the NAND gate component D52, and the flip-flop component D66, and also the transistors V50 and V80 for deactivating the data lines D+ and D−. Here, the interface monitoring device 5 manages without any microcontroller, in particular, without reverting to the use of the BIOS component 7 and thus also without software control.

What is claimed is:

1. An interface monitoring device for a differential interface port with a positive and a negative data line for connecting a peripheral device, the interface monitoring device comprising:

a monitoring circuit coupled with the positive and the negative data line, wherein the monitoring circuit is designed to monitor data traffic on the positive and negative data lines and comprises a comparator for comparing a voltage level of a node with a predetermined reference voltage, wherein the node is connected to a signal input of the comparator, the node being further connected, by a first resistor, to the positive data line and, by a second resistor, to the negative data line, wherein a signal output of the comparator is coupled to a filter circuit for filtering out zero crossings of the voltage level of the node, and wherein the monitoring circuit is further designed to signal a disconnection of the peripheral device from the differential interface port when the voltage level of the node falls below the predetermined reference voltage for a predetermined time period, wherein the filter circuit comprises an RC element with a predetermined time constant that designates the predetermined time period; and a deactivation circuit, wherein the deactivation circuit is designed to stop the data traffic via at least one of the positive and negative data lines of the differential interface port until the interface monitoring device is reset when a disconnection of a peripheral device connected to this port was signaled by the monitoring circuit.

2. The interface monitoring device according to claim 1, further comprising an initialization circuit for resetting the interface monitoring device, wherein the initialization circuit is designed to activate the interface monitoring device when a first control signal is provided.

3. The interface monitoring device according to claim 2, wherein the initialization circuit evaluates at least one second control signal for signaling an operating state, wherein the interface monitoring device is reset only when a change from an operating state is signaled in which the differential interface port is reinitialized.

4. The interface monitoring device according to claim 1, wherein the interface monitoring device is constructed as a discrete hardware circuit, wherein at least the monitoring circuit works functionally independent of a software controller of the differential interface port.

5. The interface monitoring device according to claim 1, wherein the interface monitoring device has a plurality of interface ports and wherein, at least one of a separate monitoring circuit and deactivation circuit is provided for each interface port.

6. A computer system comprising:

at least one interface port for connecting a peripheral device with a positive and a negative data line;

a monitoring circuit coupled with the positive and the negative data line, wherein the monitoring circuit is designed to monitor data traffic on the positive and negative data lines and comprises a comparator for comparing a voltage level of a node with a predetermined reference voltage, wherein the node is connected to a signal input of the comparator, the node being further connected, by a first resistor, the positive data line and, by a second resistor, to the negative data line, wherein a signal output of the comparator is coupled to a filter circuit for filtering out zero crossings of the voltage level of the node, and wherein the monitoring circuit is further designed to signal a disconnection of the peripheral device from the interface port when the voltage level of the node falls below a predetermined reference voltage for a predetermined time period, wherein the filter circuit comprises an RC element with a predetermined time constant that designates the predetermined time period; and a deactivation circuit, wherein the deactivation circuit is designed to stop the data traffic via at least one of the positive and negative data lines of the at least one interface port until a reset is generated when a disconnection of a peripheral device connected to this port was signaled by the monitoring circuit.

7. The computer system according to claim 6, further comprising a non-volatile memory with a BIOS program for initializing the computer system and for subsequent loading of an operating system.

8. The computer system according to claim 7, wherein the BIOS program determines a device class of a peripheral device connected to the interface port when the computer system is started and compares this determined device class with a list of permissible device classes, activates monitoring of the interface port by the monitoring circuit when a peripheral device of a permissible class is identified and deactivates the interface port when a peripheral device with an impermissible device class is identified.

9. A method for monitoring a differential interface port with a positive and a negative data line, the method comprising:

continuously comparing, by a comparator, a voltage level of a node with a predetermined reference voltage, wherein the node is connected to a signal input of the comparator, the node being further connected, by a first resistor, to the positive data line and, by a second resistor, to the negative data line;

filtering, by a filter circuit comprising an RC element with a predetermined time constant, an output signal of the comparator to filter out zero crossings of the voltage level of the node, signaling a disconnection of a peripheral device from the interface port when the voltage level of the node falls below the predetermined reference voltage for a predetermined time period, wherein the predetermined time period is determined by the time constant of the RC element; and deactivating the interface port until the interface monitoring device is reset when a disconnection of the peripheral device from the interface port is signaled.

10. The method according to claim 9, further comprising resetting the interface port.

11. The method according to claim 10, further comprising, after resetting the interface port:

initializing the interface port;

identifying whether a peripheral device is connected to the interface port;

deactivating the interface port when no peripheral device was identified at the interface port;

identifying the device type when a peripheral device was identified at the interface port; and deactivating the interface port when the identified device type corresponds to an impermissible device class.

12. The method according to claim 11, wherein the interface port remains operational when the identified device type corresponds to a permissible device class.

13. The method according to claim 12, wherein the permissible device class includes a keyboard and a mouse and wherein the impermissible device class includes a removable memory device and a hub.

14. The method according to claim 9, further comprising after deactivating the interface port:

determining that a peripheral device has been connected to the interface port;

determining that the peripheral device is a removable memory or a USB hub; and deactivating the interface port.

15. The method according to claim 9, further comprising after deactivating the interface port:

determining that a peripheral device has been connected to the interface port;

determining that the peripheral device is not a removable memory or a USB hub; and communicating with the peripheral device via the interface port.

* * * * *